United States Patent [19]

Eickmann

[11] 4,265,497
[45] May 5, 1981

[54] RADIAL BEARING

[76] Inventor: Karl Eickmann, 2420 Isshiki, Hayama-machi, Kanagawa-ken, Japan

[21] Appl. No.: 12,625

[22] Filed: Feb. 16, 1979

Related U.S. Application Data

[63] Continuation-in-part of Ser. No. 765,221, Feb. 3, 1977, Pat. No. 4,193,336, which is a continuation-in-part of Ser. No. 528,346, Nov. 29, 1974, Pat. No. 4,037,523.

[51] Int. Cl.³ .................. F16C 19/26; F16C 33/36
[52] U.S. Cl. .................................. 308/215; 308/216
[58] Field of Search ............... 308/215, 216, 202, 217, 308/207 R, 237 A, 237 R

[56] References Cited

U.S. PATENT DOCUMENTS

| | | | |
|---|---|---|---|
| 3,954,313 | 5/1976 | Haenel | 308/216 |
| 4,010,527 | 3/1977 | Swanson | 308/215 |
| 4,089,570 | 5/1978 | Markfelder et al. | 308/216 |

Primary Examiner—Lenard A. Footland

[57] ABSTRACT

The radial bearing has an inner ring and an outer ring and rolling members therebetween. The rolling members may be guided in a retainer. One of the rings may be stationary and the other rotary. The inner ring has an inwardly open annullar grove for the partial or temporary reception of machinery members. The inner ring has also a medial radial extension which extends radially outwardly beyond a pair of guide faces for the rolling members. The outer ring has a cylindrical inner face which forms the other guide face for the rolling members. The radial extension provides a good radial rigidity to the inner ring and at the same time prevents axial dislocation of the rolling members and of their retainer. The rolling members can have medial narrowed portions between end portions and the end portions can be designed either for high efficiency or for long life respectively.

7 Claims, 9 Drawing Figures

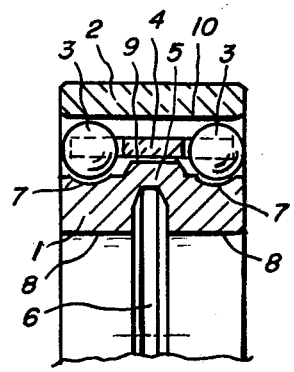
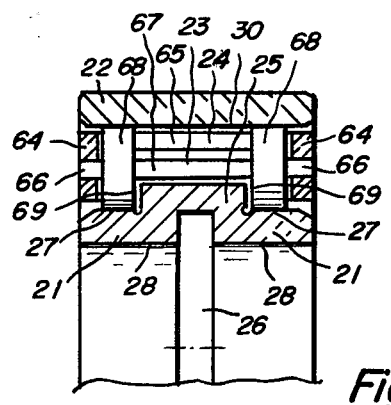
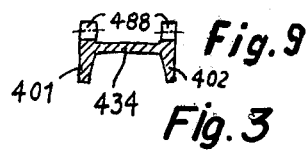
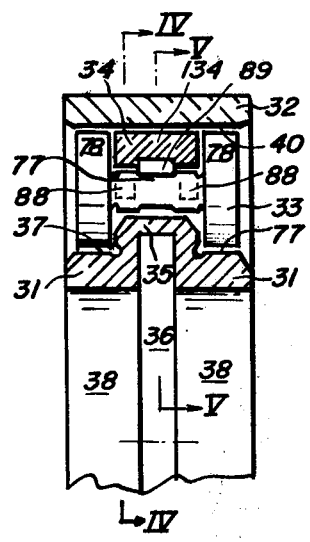
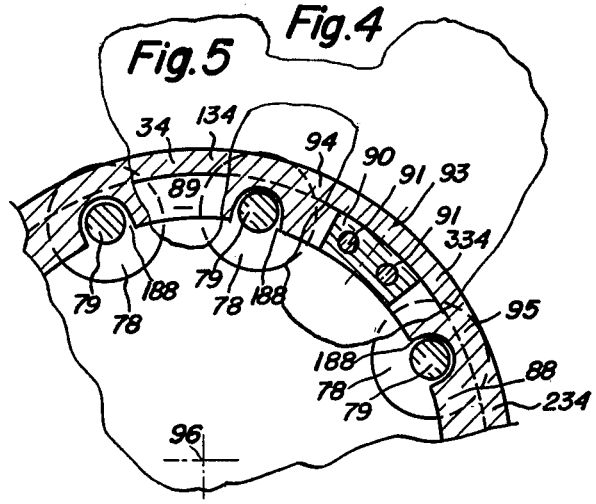
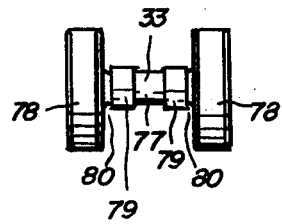
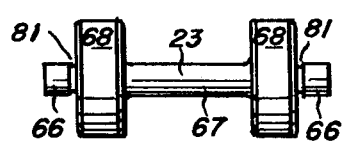

RADIAL BEARING

REFERENCE TO RELATED APPLICATIONS

This is a continuation in part application of my copening patent application Ser. No. 765,221 filed on Feb. 3, 1977, now U.S. Pat. No. 4,193,336, and which in turn is a continuation in part application of my earlier patent application, Ser. No. 528,346 of filing date Nov. 29, 1974 which is now U.S. Pat. No. 4,037,523 issued on July 26, 1977.

Priority of the earliest application of Nov. 29 th, 1974 is partially claimed for this present application.

BACKGROUND OF THE INVENTION

This invention relates to radial bearings having an inner ring and an outer ring and rolling members therebetween. One of the rings may be stationary and the other of the rings may be rotary. One of the rings is borne by the rolling members between the rings on the other ring.

Thoese baraings are generally known as ball-or roller bearings, they are standadizized and are widely in use.

However, the rings of the known bearings commonly have not anough radial dimension to stay in themselves radially undeformable. They are therefore required to be pressed into seats or kept in or on seats of respective machinery parts.

The inner rings are uncapable of taking temporary machinery part portions into the respective ring.

When oil flows through the rings and along the rolling memebers, such oil or fluid provides a considerable resistance against the rolling motion of the rolling members and thereby reduces the efficiency of the bearing of the known art at high speeds very considerably.

In high-speed hydarulic pumps or motors the resistance of oil in such known bearings becomes sometimes so disastrously high, that the efficiency of the pump or motor may be reduced up to fifteen percent and in very high speed hydraulic pumps and motors the friction losses in oil would become almost as high as the power of the pump or motor and thereby reduce the output by friction losses to almost zero.

It is therefore the first object of the invention to overcome the above described difficulties of the radial bearings of the former art.

To realize the first object of the invention, the bearing of the invention defines a new structure and thereby additional objects of the invention.

The novel construction consists therein,
that the bearing has an outer ring with an inner cylindrical guide face,
that the bearing has an inner ring with a medial portion between two end portions,
that the end portions of the inner ring are provided with outer faces which form outer guide faces and which are also cylindrical faces,
that the medial portion of the inner ring forms a radially outwardly extending radial extension between the guide faces of the end portions of the inner ring,
that rolling members are interposed between the inner and outer guide faces
and that the rolling members are guided against axial dislocation by the outer configuration of the inner ring.

Due to further alternative structure and objects of the invention, the rolling members may have a medial narrower portion between radially wider endportions;
the rolling members may be mounted into a retainer ring which may revolve with medial velocity between the inner and outer ring,
the radial extension of the inner ring may guide the inner faces of the endportions of the rolling members,
the rolling members may have narrowed guide extensions endwards of the endportions and the guide extensions may be held in a retainer;
the medial narrower portions of the rolling members may be hold by a retainer;
the rolling members may be balls which are guided in outer grooves in the endportions of the inner ring;
the inner ring may have in the medial portion between the endportions a radially extending annullar grove which extends from an inner face of the inner ring radially into the inner ring and divides the inner face into two cylindrical inner face portions
and the annullar grove may receive radial extension portion s of a memeber eccentrically provided within the inner ring.

By the structure and objects of the invention the rings and rolling members of the bearing are formed in such a style, that oil can easily escape from the rolling faces, that the rolling members are guided and that the bearing can be made either for high efficiency or for long life or for both and the friction of fluid in the bearing becomes considerably reduced, whereby the efficiency and life of the novel bearing becomes considerably improved. The efficiency improvement can become so high that it decides about the application ability in high speed hydraulic pumps and motors, where the bearings of the former art entirely failed.

More details will become appearent from the drawing and from the description of the preferred embodiments.

BRIEF DESCRIPTION OF THE DRAWING

FIG. 1 is a longitudinal sectional view through an embodiment of a bearing of the invention.

FIG. 2 is a longitudonal sectional view through another embodiment of a bearing of the invention;

FIG. 3 is a longitudinal sectional view through still another embodiment of a bearing of the invention;

FIG. 4 is a cross-sectional view through FIG. 3 along the line IV—IV;

FIG. 5 is a cross-sectional view through FIG. 3 along the line V—V and incorporated into FIG. 4;

FIG. 6 is a view onto a rolling member of the invention;

FIG. 7 is a view onto another embodiment of a rolling member of the invention;

FIg. 8 is a cross-sectional view through a retainer of the invention; and

FIG. 9 is a cross-sectional view through an other retainer of the invention.

DESCRIPTION OF THE PREFERRED EMBODIMENTS

In FIG. 1 the sample of a radial bearing of the invention has an outer ring 2 with a cylindrical inner guide face 10 wherelong the rolling members 3 are able to roll. The bearing also has an inner ring 1 which has guide faces 7 of a configuration suitable for enabling the rolling members 3 to roll there along. The inner ring 1 is borne by the rolling members 3 on the inner face 10 of the outer ring 2. The rolling members 3 may be guided and hold in a retainer 4. Sofar the arrangement is known from the former art.

According to the invention, the inner ring has a medial portion and two end portions. The end portions form an inner face of usually cylindrical configuration. An annullar ring groove 6 may extend through the inner face 8 radially beyond the inner face 8 into the inner ring 1 and thereby divide the inner face 8 into two face portions 8. One such face portion 8 on one end portion of inner ring 1 and the other face portion 8 on the other end portion of inner ring 1. The annullar groove 6 is thereby in the medial portion of inner ring 1. The medial portion of inner ring 1 forms according to the invention a radial extension 5 which extends radially outwardly beyond the end portions of the inner ring 1. The outer faces of the end portions include the pair of guide faces 7 whereon the rolling members 3 are able to roll. One guide face 7 is located in one of the end portions and the other guide face 7 of the pair of guide faces 7 is located on the other end portion of the inner ring 1. The radial extension 5 of the inner rind is therefore located medially between the both guide faces 7 of the pair of guide faces 7.

Guide faces 7 are complementary formed with respect to the outer configuration of the rolling members 3, however technological reasons may demand a slight departure from the mathematically strict complelemntary configuration.

The rollers 3 may be contained in spaces in the retainer 4. The radial extension 5 may form a guide face 9 for the guiding of an inner face of the retainer 4.

When the rolling members of one of the guide faces 7 are separated from the rolling members of the other guide face 7, the rolling members 3 may either be axially kept by the configuration of the guide faces 7 or by the retainer's configuration.

Since the rolling members 3 can not move axially over the radial extension 5 an axial departure of the retainer 4 or of the rolling members 3 is prevented.

The radial extension 5 gives an increased radial strength to the inner ring 1 and thereby reduces or prevents radial deflection of the inner ring 1, whereby an efficient and long life of the bearing is obtained. By making the contact lengthes between the faces of the rolling members 3 and the guide faces 10 and 7 of the rings short, it becomes easy for fluid in the bearing to escape away from the areas before the rolling members. Thereby the high efficiency of the bearing is also assured. The ring groove 6 may receive partially or temporary a radial extension or extensions of a length shorter than the width of the groove 6, when a respective member is located inside of inner ring 6.

In FIG. 2 the outer ring 22 has the inner cylindrical guide face 30 wherealong the rolling members 23 are able to roll. The inner ring 21 has inner face portions 28 which are interrupted by the annullar groove 26. Radial extension 25 extends radially outwardly beyond the guide faces 27 on both end portions of the inner ring 21. Insofar the functions are similar to the equal parts and faces with equal end-digits in FIG. 1.

However, the guide faces 27 are cylindrical faces of equal diameter and radii around the same axis. The rolling members 23 are inserted between the rings and are rolling on their respective guide faces. The rolling members are however consisting each of five portions around an equal medial axis. Endwards of the narrowed medial portion with smaller diameter are the bearing roller portions 68 provided and have diameters which are equal relatively to each other, but which are bigger than the smaller diameter of the medial portion 67 between said bearing roller portions 68. Endwards of the bearing roller portions 68 are the end-guide portions 66 provided. It is prefered, that their diameters are equal relatively to each other but smaller in diameter than the diameters of the bearing roller portions 68. The end-guide portions extend into cylindrical bores in retainer 64. Retainer 64 may be divided into a left portion and a right portion. The radial extension 25 has endfaces 69 whereon the innermost faces of both bearing roller portions 68 are guided in order to prevent an axial dislocation of the rollers or retainer.

The rolling members 23 are led around the inner ring 21 so, that the innermost faces of the bearing roller portions 68 are set along the end faces 69 of the radially extending extension 25 of inner ring 21. Thereafter one half of the retainer 64 is set over the rolling members, so, that the respective end-guide portions 66 fit in the respective bores in retainer half 64. The other retainer half 64 is then moven from the other end over the rolling members 23, whereby the other end-guide portions 66 of the rolling members 23 are entering the respective bores in the other retainer half 64. The retainer halfs 64 are then fastened together for example by rivets. The assembly of the retainer 24 and of the rolling members 23 around the inner ring 21 is then completed. The outer ring 22 can then be moved axially over the bearing roller portions 68 so, that they are able to roll along the inner face 30 of the outer ring 22. The bearing is then completely assembled.

The radial bearing of FIG. 2 has the features that the inner ring guides the rolling members, the rolling members guide the retainers, the inner ring has great radial strength due to the radial extension 25 and the bearing has either a high efficiency or a long life or both depending on the selection of the ratio between the length of the bearing roller portions 68 to their diameter. Long portions 68 of smaller diameter give a larger bearing capacity.

Short portions 68 are giving a good efficiency but a smaller bearing capacity. Thus, the designer has it in his hands, to elect the desired effect by the ratio lentgh to diameter of the portions 68. Further features of this assembly are, that the rolling members 23 are guided at distanced portions 66 whereby an accurate guide for the parallelity of the axes of the rolling members to the axis of the inner and outer ring is obtained. Another feature is the reduction of friction along the guide means of the rolling members by the application of a smaller diameter to the guide end portions 66. Since the smaller diameters of portions 66 give smaller speed between the guides and rollers than in usual roller bearings of the former art, where the retainers are guiding the biggest diameters of the rollers, the friction in the bearing of FIG. 2 is smaller than that of common standard roller bearings. Thereby the efficiency of the roller bearing of the invention is gaian increased.

The radial bearing of FIG. 3 is substantially similar to that of FIG. 2 and has similar functions. However, in this bearing another kind of retainer 34 is used which in turn requires another configuration of the rolling members 33.

Portions of retainer 34 are shown in FIGS. 4 and 5 which are cross-sectional figures through FIG. 3 and therefore belong to the bearing of FIG. 3. Retainer 34 is cut into parts, for example 334 and 234. Retainer 34 has a medial portion 134 and end portions 88. The medial portion has a bigger inner diameter and the end portions have a smaller diameter. Thereby the end portions 88 extend radially inwardly beyond the inner diameter of the medial portion 134. Radially from inward are guide seats 188 cut into the end portions 188 of the retainer 34 for the reception and guidance of the medial guide portions 79 of the respective rolling members 33. Between the end portions 88 is an empty space 89. The rolling members of FIG. 3 are separately shown in FIG. 6. They have medial guide portion paris 79 of a diameter smaller than the diameter of the bearing roller portions 78.

For assembly of the bearing of FIG. 3 the respective rolling members are radially from inside of the retainer 34 moves radially outwards to be inserted into the respective guide seats 188, whereby the guide portion pairs 79 get a guide and seat in the seats 188. They may be glued there slightly for the time of assembly by greas. The parts 234 and 334 of retainer 34 are then moved from the radial outside radially inwardly over the inner ring 31 whereby connection members 90 are inserted into the empty space 89 for facing parts of the end-portions 88 of two retainer portions 234 and 334. At same assembly action the innermost faces of the bearing roller portions 78 are set along the radial faces of the ends of the radial extension 35. When the parts 234 and 334 of retainer 34 are moved fully towards each other a fastening means, for example a rivett or rivetts are set into respective bores through connection member 90 and the end portions 88 of tye retainer 34. Thereby the retainer parts 234 and 334 are meeting at face or slot 93 and the fasteners 91 through the connection members 90 and the end portions 88 of the retainer parts are keeping the parts 234 and 334 of the retainer 34 exactly together. The assembly of the bearing of these figures is then complete. Outer ring 32 may then be moved over the bearing roller members 78.

In FIGS. 6 and 7 the respective rolling members of FIGS. 3 and 2 are separatedly shown. FIG. 7 shows the medial narrowed diameter portion 67 which keeps the bearing rolling portions 68 together on the same axis. Endwards of the roller portions 68 are the guide portions or end-guide portions 66 provided also around the same axis. Intersecting grooves 81 may be provided between the rolling bearing portions 68 and the end-guide portions 66 in order to make an accurate grinding of the end-guide portions 66 around the same axis as the roll-portions 68 possible.

The rolling members of FIG. 6 do not need end-portions 66 because in this case the guide portions are guide portions 79 an the medial portion 77. In order to make an accurate grinding of the guide-portions 79 possible, there may be undercutting grooves 80 between the rolling bearing portions 78 and the guide portions 79. The medial portion 33 may also have a reduced or undercut medial portion 77 between the guide portions 79.

In each case of the rolling members the bearing portions 68,78 are rolling along the bearing faces of the inner and outer rings of the bearing assembly. The bearing portions 68,78 are radially of bigger diameters than the guide portions 79,66 in order to reduce the relative velocity between the retainer seat and the guide portions relatively to the diameters of bearing portions 68 or 78.

Each bearing assembly contains a number of seats in the respective retainer for the assembly of a number of rolling members into the respective bearing assembly.

The retainer separately shown in FIG. 8 is basically equal to that of FIG. 2 with the difference, that the retainer of FIG. 8 has lubrication fluid collection chambers 132 on each axial end of the retainer 131. The lubrication fluid collection chambers 132 are formed by radially inwardly extending endfaces 131 which embrace the collection chazmbers 132. Under the centrifugal forces which act in the fluid when the retainer revolves the lubrication fluid collects in the chambers 132 and moves from there into the clearances between the seats 166 and the end guide portions 66 of the rolling members 23 of FIGS. 2, 7 and 8.

FIG. 8 also demonstrates that the retainer 131 may consist of two halfes a right half and a left half which can be taken away from each other in axial direction to insert the respective end-guide portions 66 of the rolling members 23 into the guide seats 166 of the retainer halfes respectively whereby the retainer halfs 131 are then moved towards each other and fastened together after the insertion of all respective rolling members 23.

The radially extending grooves 6,26 and 36 of the inner rings 1,21,31 of the bearing assemblies of the invention have the further purposes of making the inner rings light in weight, keeping the cross-sectional areas through the rings substantially equal, provision of an excellent seat of two spaced seat portions 8 when the ring shall be seated on a revolving member and also for the provision of own radial rigidity to make it possible that the ring can revolve without additional radial support within the bearing assembly.

The reduction of weight of the inner rings by the application of the medial ring grooves 6,26,36 is important for improving the speed of response at accellerations of the rotary motion of the rings. The provision of the annullar ring grooves reduces the masses of the inner rings and thereby quickens the possibility of responses when the rotary velocity of the inner rings shall increase or slow down.

The provision of substantially equal cross-sectional areas of the inner rings 1,21,31 by the application of the ring grooves 6,26,36 prevents difficulties at hardening and also prevents differences in strength of portions of the inner rings.

The self-supporting radial rigidity of tne inner ring of the bearing of the invention makes the bearing applicable also at such applications, where the inner ring is not set onto a cylindrical shaft or like.

The provision of the annullar groove in the inner ring makes very stable end supports of the inner rings possible.

When the inner ring has two cylindrical inner faces of equal diameter around the same axis on both ends of the annullar medial ring groove, the inner ring may perfectly serve as an actuator ring for pumps, compressors, motors, transmissions of radial chamber devices with flow of fluid through their chambers. For example, for radial piston pumps and motors with large piston strokes.

There are a number of modifications possible without leaving the scope of the invention. For example, the bores or slots in the retainer 4 of FIG. 1 may be replaced by rectangular recesses with inner faces parallel to the medial extension 5 and others normal thereto in order to replace the balls of FIG. 1 by rollers and guide the said rollers in the mentioned rectangular recesses.

In FIGS. 3 to 5 the retainer 34 may also be without the annullar grove 89. Instead of setting an insert 90 into the annullar groove 89 of the retainer halfs 234 and 334 the retainer halfs may have extensions which are fastened to the other retainer half.

It would also be possible to set the first retainer portion of FIG. 3 radially inward of the medial portions 33 of the rolling members in FIG. 3. Such retainer would then for example have a cross-section as shown in FIG. 9. The radial outward extensions on the ends of the retainer 434 will then have the guide seats 488 whereinto the rolling members can be led radially from outside. The radial inward extensions 401 and 402 also on the ends of the retainer will then serve for radial rigidness of the retainer halfs. The retainer will be again divided into halfs similar to the reteiner in FIGS. 3 to 5. But the retainer halfs will then not require fastening means relatively to each other because the retainer halfs are now kept by the respective guide portions of the rolling members.

While the invention has been illustrated and described on single radial bearings it is not intended to be limited to the details shown since various modifications may be made without departing in any way from the spirit of the present invention.

Without further analysis, the foregoing will so fully reveal the gist of the present invention that other can by applying current knowledge readily adapt it for various applications without omitting features that from the standpoint of prior art fairly constitute essential characteristics of the generic or specific aspects of this invention.

I claim:

1. A radial bearing including an inner ring, an outer ring, at least one cylindrical inner face on said outer ring, outer face means on said inner ring, and rolling members between said rings for rolling along said inner face and along portions of said outer face means for revolvingly bearing one of said rings on the other of said rings,
   wherein said inner ring includes a medial portion,
   wherein said medial portion is provided between two end portions,
   wherein said end portions have outer faces of equal radii around a common axis,
   wherein said medial portion extends radially outwardly beyond said end portions,
   wherein said rolling members include bearing portions located radially of said outer faces,
   wherein said bearing portions of said rolling members are able to engage and to roll along said faces,
   wherein said inner ring is hollow and has inner face means,
   wherein a radially extending annular groove is provided in the said medial portion of said inner ring, extending radially outwardly beyond said inner face means into said inner ring,
   wherein a retainer is provided between said rings,
   wherein said retainer has radially directed recesses,
   wherein said members are guided in said recesses of said retainer,
   wherein one group of said members is located radially of one of said outer faces and another group of said members is located radially of an other of said outer faces,
   wherein said medial portion has a medial outer face,
   wherein said retainer has a medial inner face, and
   wherein said medial inner face is guided on said medial outer face.

2. A radial bearing including an inner ring, an outer ring, at least one cylindrical inner face on said outer ring, outer face means on said inner ring, and rolling members between said rings for rolling along said inner face and along portions of said outer face means for revolvingly bearing one of said rings on the other of said rings,
   wherein said inner ring includes a medial portion,
   wherein said medial portion is provided between two end portions,
   wherein said end portions have outer faces of equal radii around a common axis,
   wherein said medial portion extends radially outwardly beyond said end portions,
   wherein said rolling members include bearing portions located radially of said outer faces,
   wherein said bearing portions of said rolling members are able to engage and to roll along said faces,
   wherein said inner ring is hollow and has inner face means,
   wherein a radially extending annular groove is provided in the said medial portion of said inner ring, extending radially outwardly beyond said inner face means into said inner ring,
   wherein said rolling members are forming roller-pairs by said bearing portions whereof each pair has a first roller and a second roller, said first rollers are located over a first face-portion of said face means, the second rollers are located over a second face-portion of said face means,
   wherein medial bars are provided between said first and second rollers of the respective roller pair to rigidly connect said rollers of the respective roller-pair,
   wherein said medial bars are of smaller diameters, than the diameters of said rollers of said roller-pairs are, and,
   wherein said rollers of said pairs are extending radially inwardly beyond the outer diameter of said medial portion,
   whereby equal location of said rollers of said roller-pairs on said first and second portions are provided and the connection of said rollers of said roller-pairs is provided radially of said medial portion and of said annullar groove of said inner ring,
   wherein said first and second face portions of said outer face means of said inner ring are cylindrical faces around said common axis,
   wherein said rolling members form said rollers as said portions axially of said medial bars,
   wherein one of said bearing portions is located on one axial end of said medial portion and the other of said bearing portions is located on the other axial end of said medial portion,
   wherein said bearing portions are of a bigger diameter than said medial bars,
   wherein said bearing portions having cylindrical outer faces of equal radii around the axis of said rolling member,
   wherein said bearing portions are located radially of said cylindrical faces of said inner ring, respectively,
   wherein the axes of said rolling members are parallel to the axis of said inner ring,
   wherein one of said bearing portions of the respective rolling member bears and rolls on one of said cylindrical faces of said inner ring and the other bearing portion of the respective rolling member bears and rolls on the other of said cylindrical faces of said inner ring, and
   wherein the difference of radii of said medial bars and said bearing portions of said rolling members exceeds the radial extension of said medial portion of said inner ring,
wherein a retainer is provided between said rings,
wherein said retainer includes guide seats,
wherein said rolling members include at least one guide portion, and;
wherein said guide portion is guided in at least one of said guide seats.

3. A radial bearing including an inner ring, an outer ring, at least one cylindrical inner face on said outer ring, outer face means on said inner ring, and rolling members between said rings for rolling along said inner face and along portions of said outer face means for revolvingly bearing one of said rings on the other of said rings,
wherein said inner ring includes a medial portion,
wherein said medial portion is provided between two end portions,
wherein said end portions have outer faces of equal radii around a common axis,
wherein said medial portion extends radially outwardly beyond said end portions,
wherein said rolling members include bearing portions located radially of said outer faces,
wherein said bearing portions of said rolling members are able to engage and to roll along said faces,
wherein said inner ring is hollow and has inner face means,
wherein a radially extendng annular groove is provided in the said medial portion of said inner ring, extending radially outwardly beyond said inner face means into said inner ring,
wherein said rolling members are forming roller-pairs by said bearing portions whereof each pair has a first roller and a second roller, said first rollers are located over a first face-portion of said face means, the second rollers are located over a second face-portion of said face means,
wherein medial bars are provided between said first and second rollers of the respective roller pair to rigidly connect said rollers of the respective roller-pair,
wherein said medial bars are of smaller diameters, than the diameters of said rollers of said roller-pairs are, and,
wherein said rollers of said pairs are extending radially inwardly beyond the outer diameter of said medial portion,
whereby equal location of said rollers of said roller-pairs on said first and second portions are provided and the connection of said rollers of said roller-pairs is provided radially of said medial portion and of said annullar groove of said inner ring,
wherein said first and second face portions of said outer face means of said inner ring are cylindrical faces around said common axis,
wherein said rolling members form said rollers as said portions axially of said medial bars,
wherein one of said bearing portions is located on one axial end of said medial portion and the other of said bearing portions is located on the other axial end of said medial portion,
wherein said bearing portions are of a bigger diameter than said medial bars,
wherein said bearing portions have cylindrical outer faces of equal radii around the axis of said rolling member,
wherein said bearing portions are located radially of said cylindrical faces of said inner ring, respectively,
wherein the axes of said rolling members are parallel to the axis of said inner ring,
wherein one of said bearing portions of the respective rolling member bears and rolls on one of said cylindrical faces of said inner ring and the other bearing portion of the respective rolling member bears and rolls on the other of said cylindrical faces of said inner ring, and
wherein the difference of radii of said medial bars and said bearing portions of said rolling members exceeds the radial extension of said medial portion of said inner ring,
wherein a retainer is provided between said rings,
wherein said retainer includes guide seats,
wherein said rolling members include at least one guide portion,
wherein said guide portion is guided in at least one of said guide seats,
wherein said guide portions are formed by said medial bars of said rolling members,
wherein said retainer includes a first portion and a second portion,
wherein said first portion of said retainer is located radially outwardly of said medial bars of said rolling members,
wherein said guide seats are formed on said second portion, and
wherein said guide seats partially embrace said guide portions respectively.

4. A radial bearing including an inner ring, an outer ring, at least one cylindrical inner face on said outer ring, outer face means on said inner ring, and rolling members between said rings for rolling along said inner face and along portions of said outer face means for revolvingly bearing one of said rings on the other of said rings,
wherein said inner ring includes a medial portion,
wherein said medial portion is provided between two end portions,
wherein said end portions have outer faces of equal radii around a common axis,
wherein said medial portion extends radially outwardly beyond said end portions,
wherein said rolling members include bearing portions located radially of said outer faces,
wherein said bearing portions of said rolling members are able to engage and to roll along said faces,
wherein said inner ring is hollow and has inner face means,
wherein a radially extending annular groove is provided in the said medial portion of said inner ring, extending radially outwardly beyond said inner face means into said inner ring,
wherein said rolling members are forming roller-pairs by said bearing portions whereof each pair has a first roller and a second roller, said first rollers are located over a first face-portion of said face means, the second rollers are located over a second face-portion of said face means,
wherein medial bars are provided between said first and second rollers of the respective roller pair to rigidly connect said rollers of the respective roller-pair, wherein said medial bars are of smaller diameters, than the diameters of said rollers of said roller-pairs are, and, wherein said rollers of said pairs are extending radially inwardly beyond the outer diameter of said medial portion, whereby equal location of said rollers of said roller-pairs on said first and second portions are provided and the connection of said rollers of said roller-pairs is provided radially of said medial portion and of said annullar groove of said inner ring, wherein said first and second face portions of said outer face means of said inner ring are cylindrical faces around said common axis, wherein said rolling members form said rollers as said portions axially of said medial bars, wherein one of said bearing portions is located on one axial end of said medial portion and the other of said bearing portions is located on the other axial end of said medial portion, wherein said bearing portions are of a bigger diameter than said medial bars, wherein said bearing portions have cylindrical outer faces of equal radii around the axis of said rolling member, wherein said bearing portions are located radially of said cylindrical faces of said inner ring, respectively, wherein the axes of said rolling members are parallel to the axis of said inner ring, wherein one of said bearing portions of the respective rolling member bears and rolls on one of said cylindrical faces of said inner ring and the other bearing portion of the respective rolling member bears and rolls on the other of said cylindrical faces of said inner ring, and wherein the difference of radii of said medial bars and said bearing portions of said rolling members exceeds the radial extension of said medial portion of said inner ring, wherein a retainer is provided between said rings, wherein said retainer includes guide seats, wherein said rolling members include at least one guide portion, wherein said guide portion is guided in at least one of said guide seats, wherein said rolling members have pairs of endmembers, wherein said endmembers are located axially endwards of said bearing portions of said rolling members, wherein one endmember of the respective rolling member is axially extending from a first end of the respective bearing member of the respective rolling member and the other endmember of the respective pair of endmembers is axially extending from a second end of the other bearing member of the respective rolling member, wherein said endmembers are forming said guide portions, wherein said retainer includes said guide seats radially outwardly of said endmembers respectively, and wherein said guide seats are partially embracing said guide portions of said endmembers respectively.

5. A radial bearing including an inner ring, an outer ring, at least one cylindrical inner face on said outer ring, outer face means on said inner ring, and rolling members between said rings for rolling along said inner face and along portions of said outer face means for revolvingly bearing one of said rings on the other of said rings, wherein said inner ring includes a medial portion, wherein said medial portion is provided between two end portions, wherein said end portions have outer faces of equal radii around a common axis, wherein said medial portion extends radially outwardly beyond said end portions, wherein said rolling members include bearing portions located radially of said outer faces, wherein said bearing portions of said rolling members are able to engage and to roll along said faces, wherein said inner ring is hollow and has inner face means, wherein a radially extending annular groove is provided in the said medial portion of said inner ring, extending radially outwardly beyond said inner face means into said inner ring, wherein said rolling members are forming roller-pairs by said bearing portions whereof each pair has a first roller and a second roller, said first rollers are located over a first face-portion of said face means, the second rollers are located over a second face-portion of said face means, wherein medial bars are provided between said first and second rollers of the respective roller pair to rigidly connect said rollers of the respective roller-pair, wherein said medial bars are of smaller diameters, than the diameters of said rollers of said roller-pairs are, and, wherein said rollers of said pairs are extending radially inwardly beyond the outer diameter of said medial portion, whereby equal location of said rollers of said roller-pairs on said first and second portions are provided and the connection of said rollers of said roller-pairs is provided radially of said medial portion and of said annullar groove of said inner ring, wherein said first and second face portions of said outer face means of said inner ring are cylindrical faces around said common axis, wherein said rolling members form said rollers as said portions axially of said medial bars, wherein one of said bearing portions is located on one axial end of said medial portion and the other of said bearing portions is located on the other axial end of said medial portion, wherein said bearing portions are of a bigger diameter than said medial bars, wherein said bearing portions have cylindrical outer faces of equal radii around the axis of said rolling member, wherein said bearing portions are located radially of said cylindrical faces of said inner ring, respectively, wherein the axes of said rolling members are parallel to the axis of said inner ring, wherein one of said bearing portions of the respective rolling member bears and rolls on one of said cylindrical faces of said inner ring and the other bearing portion of the respective rolling member bears and rolls on the other of said cylindrical faces of said inner ring, and wherein the difference of radii of said medial bars and said bearing portions of said rolling members exceeds the radial extension of said medial portion of said inner ring, wherein a retainer is provided between said rings, wherein said retainer includes guide seats, wherein said rolling members include at least one guide portion, wherein said guide portion is guided in at least one of said guide seats, wherein said rolling members have pairs of endmembers, wherein said endmembers are located axially endwards of said bearing portions of said rolling members, wherein one endmember of the respective rolling member is axially extending from a first end of the respective bearing member of the respective rolling member and the other endmember of the respective pair of endmembers is axially extending from a second end of the other bearing member of the respective rolling member, wherein said endmembers are forming said guide portions, wherein said retainer includes said guide seats radially outwardly of said endmembers respectively, wherein said guide seats are partially embracing said guide portions of said endmembers respectively, wherein said retainer includes radially inwardly extending endfaces on the axial ends of said retainer, wherein said retainer includes groove means between said guide seats and said end faces, and wherein lubrication fluid is forced from said groove means into said guide seats, when said retainer revolves.

6. A radial bearing including an inner ring, an outer ring, at least one cylindrical inner face on said outer ring, outer face means on said inner ring, and rolling members between said rings for rolling along said inner face and along portions of said outer face means for revolvingly bearing one of said rings on the other of said rings, wherein said inner ring includes a medial portion, wherein said medial portion is provided between two end portions, wherein said end portions have outer faces of equal radii around a common axis, wherein said medial portion extends radially outwardly beyond said end portions, wherein said rolling members include bearing portions located radially of said outer faces, wherein said bearing portions of said rolling members are able to engage and to roll along said faces, wherein said inner ring is hollow and has inner face means, wherein a radially extending annular groove is provided in the said medial portion of said inner ring, extending radially outwardly beyond said inner face means into said inner ring, wherein said rolling members are forming roller-pairs by said bearing portions whereof each pair has a first roller and a second roller, said first rollers are located over a first face-portion of said face means, the second rollers are located over a second face-portion of said face means, wherein medial bars are provided between said first and second rollers of the respective roller pair to rigidly connect said rollers of the respective roller-pair, wherein said medial bars are of smaller diameters, than the diameters of said rollers of said roller-pairs are, and, wherein said rollers of said pairs are extending radially inwardly beyond the outer diameter of said medial portion, whereby equal location of said rollers of said roller-pairs on said first and second portions are provided and the connection of said rollers of said roller-pairs is provided radially of said medial portion and of said annullar groove of said inner ring, wherein said first and second face portions of said outer face means of said inner ring are cylindrical faces around said common axis, wherein said rolling members form said rollers as said portions axially of said medial bars, wherein one of said bearing portions is located on one axial end of said medial portion and the other of said bearing portions is located on the other axial end of said medial portion, wherein said bearing portions are of a bigger diameter than said medial bars, wherein said bearing portions have cylindrical outer faces of equal radii around the axis of said rolling member, wherein said bearing portions are located radially of said cylindrical faces of said inner ring, respectively, wherein the axes of said rolling members are parallel to the axis of said inner ring, wherein one of said bearing portions of the respective rolling member bears and rolls on one of said cylindrical faces of said inner ring and the other bearing portion of the respective rolling member bears and rolls on the other of said cylindrical faces of said inner ring, and wherein the difference of radii of said medial bars and said bearing portions of said rolling members exceeds the radial extension of said medial portion of said inner ring, wherein a retainer is provided between said rings, wherein said retainer includes guide seats, wherein said rolling members include at least one guide portion, wherein said guide portion is guided in at least one of said guide seats, wherein said retainer is radially divideable into retainer portions and wherein said retainer portions are provided with holding means to mount said portions together, wherein said retainer portions having radially inwardly extending guide portions with guide faces which form said guide seats, wherein said retainer is shorter is achsial direction than the distance between said first and second rollers of said roller pairs, wherein said retainer forms radially outwardly of said radially inwardly extending portions a retainer's outer portion wherefrom said inwardly extending portions are extending radially inwardly beyond the inner face of said outer portion, wherein said outer portion is provided radially outwards of said medial bars of said roller pairs and said guide portions embrace said medial bars to guide said medial bars on said guide faces of said guide seats, wherein the outer diamter of said retainer is smaller than the diamter of said inner face of said outer ring, wherein said medial bars of said roller pairs are forming said guide portions of said rolling members, and, wherein said medial bars are axially longer than their diameters, whereby said retainer, said guide seats and said guide portions are exlusively contained within the outer defines of said rolling members.

7. A radial bearing including an inner ring, an outer ring, at least one cylindrical inner face on said outer ring, outer face means on said inner ring, and rolling members between said rings for rolling along said inner face and along portions of said outer face means for revolvingly bearing one of said rings on the other of said rings, wherein said inner ring includes a medial portion, wherein said medial portion is provided between two end portions, wherein said end portions have outer faces of equal radii around a common axis, wherein said medial portion extends radially outwardly beyond said end portions, wherein said rolling members include bearing portions located radially of said outer faces, wherein said bearing portions of said rolling members are able to engage and to roll along said faces, wherein said inner ring is hollow and has inner face means, wherein a radially extending annular groove is provided in the said medial portion of said inner ring, extending radially outwardly beyond said inner face means into said inner ring, wherein said rolling members are forming roller-pairs by said bearing portions whereof each pair has a first roller and a second roller, said first rollers are located over a first face-portion of said face means, the second rollers are located over a second face-portion of said face means, wherein medial bars are provided between said first and second rollers of the respective roller pair to rigidly connect said rollers of the respective roller-pair, wherein said medial bars are of smaller diameters, than the diameters of said rollers of said roller-pairs are, and, wherein said rollers of said pairs are extending radially inwardly beyond the outer diameter of said medial portion, whereby equal location of said rollers of said roller-pairs on said first and second portions are provided and the connection of said rollers of said roller-pairs is provided radially of said medial portion and of said annullar groove of said inner ring, wherein said first and second face portions of said outer face means of said inner ring are cylindrical faces around said common axis, wherein said rolling members form said rollers as said portions axially of said medial bars, wherein one of said bearing portions is located on one axial end of said medial portion and the other of said bearing portions is located on the other axial end of said medial portion, wherein said bearing portions are of a bigger diameter than said medial bars, wherein said bearing portions have cylindrical outer faces of equal radii around the axis of said rolling member, wherein said bearing portions are located radially of said cylindrical faces of said inner ring, respectively, wherein the axes of said rolling members are parallel to the axis of said inner ring, wherein one of said bearing portions of the respective rolling member bears and rolls on one of said cylindrical faces of said inner ring and the other bearing portion of the respective rolling member bears and rolls on the other of said cylindrical faces of said inner ring, and wherein the difference of radii of said medial bars and said bearing portions of said rolling members exceeds the radial extension of said medial portion of said inner ring, wherein a retainer is provided between said rings, wherein said retainer includes guide seats, wherein said rolling members include at least one guide portion, wherein said guide portion is guided in at least one of said guide seats, wherein said medial portion of said inner ring forms at least partially radially plane end faces, wherein said rolling members form at the inner ends of said bearing portions which form said first and second rollers at least partially radially plane innermost shoulders between said bearing portions and said medial bar and thereby on said first and second rollers of said roller pairs, and wherein said innermost shoulders are guided along said end faces of said medial portion of said inner ring, while said cylindrical inner face of said outer ring extends achsially beyond said rolling members to permit achsial freedom of movement of said inner ring and of said rolling members relatively to said outer ring.

* * * * *